UNITED STATES PATENT OFFICE.

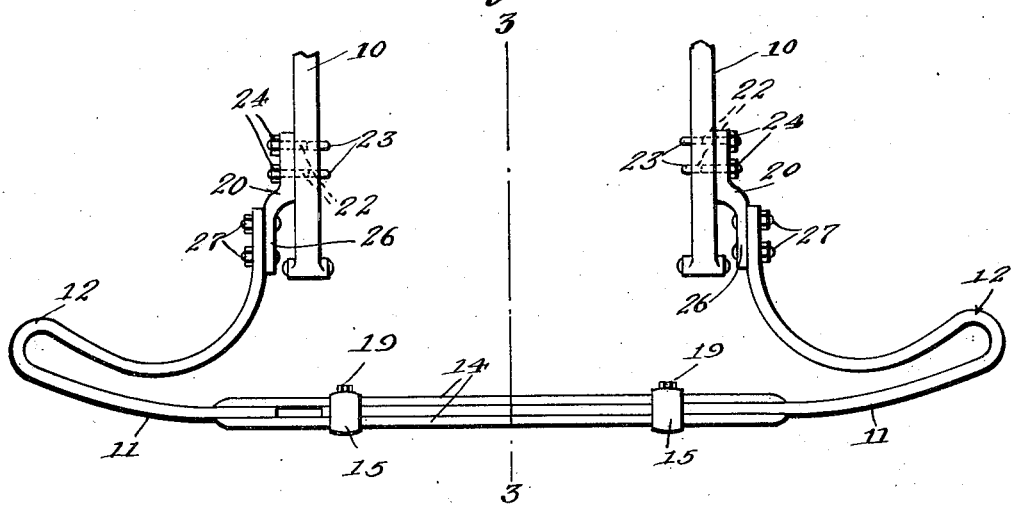
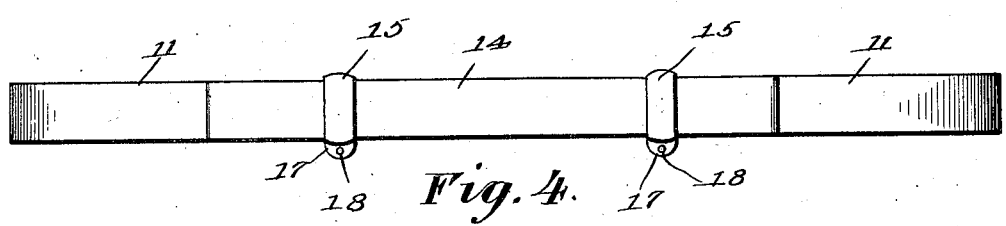
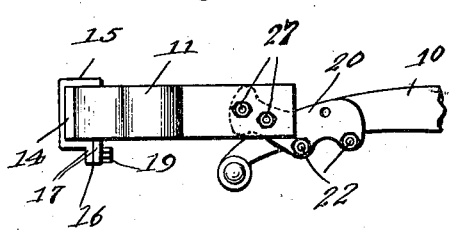
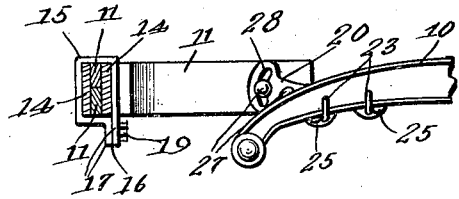

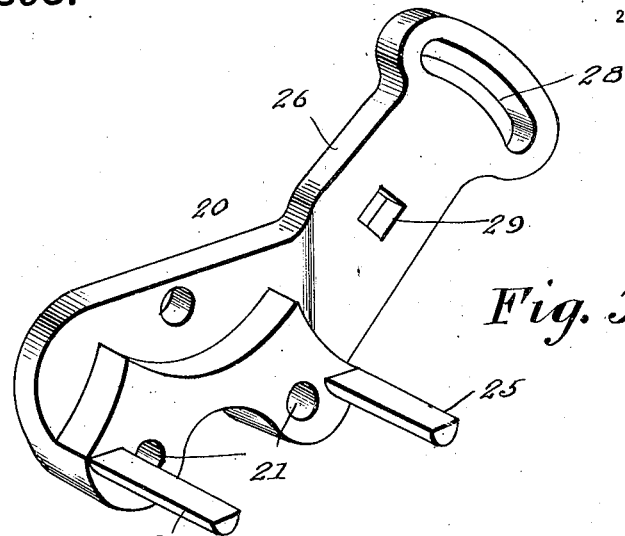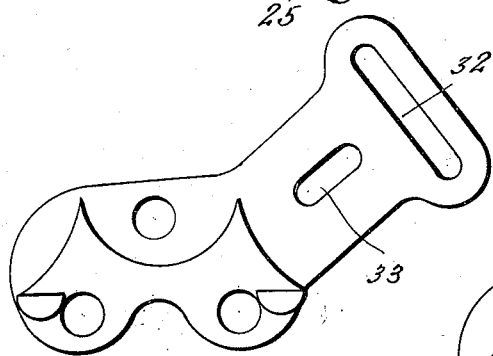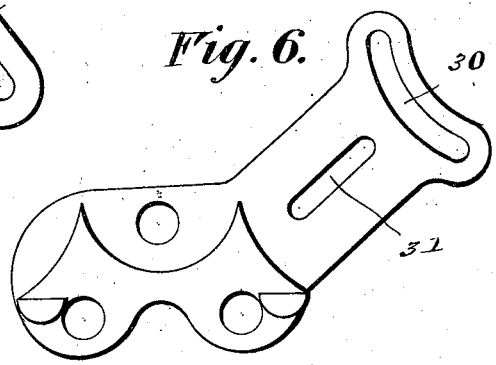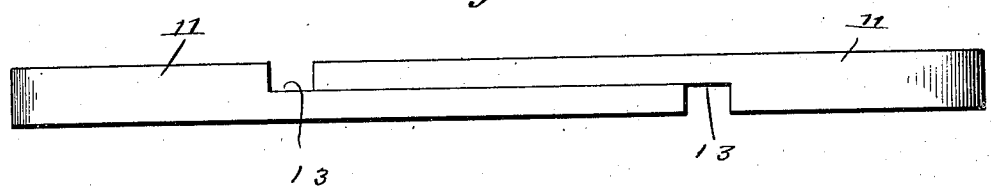

PERRY D. READ, OF NORFOLK, VIRGINIA.

AUTOMOBILE-BUMPER.

1,342,393.  Specification of Letters Patent.  Patented June 1, 1920.

Application filed December 27, 1919. Serial No. 347,730.

*To all whom it may concern:*

Be it known that I, PERRY D. READ, a citizen of the United States, residing at Norfolk, in the county of Norfolk and State of Virginia, have invented new and useful Improvements in Automobile - Bumpers, of which the following is a specification.

This invention relates to improvements in automobile bumpers and has for an object the provision of a bumper, which may be easily and quickly applied and adjusted to the proper elevation and securely held against accidental movement.

Most specifically stated, the invention resides in the novel form of clamp, which is adapted to be secured to the frame of an automobile and which is detachably and adjustably secured to the end of the bumper.

The invention further resides in the construction of the bumper proper which is formed of separate sections having their meeting ends arranged in overlapping relation and held in such a manner as to prevent sagging at the joint.

Other objects and advantages of the invention will appear as the following description is read in connection with the accompanying drawings.

In the drawings:

Figure 1 is a fragmentary plan view of the front end of an automobile frame with the invention applied thereto.

Fig. 2 is an outside elevation of the same.

Fig. 3 is a section on the line 3—3 of Fig. 1.

Fig. 4 is a front elevation.

Fig. 5 is a detail perspective of the bumper clamp.

Fig. 6 is a similar view of a modified form of clamp.

Fig. 7 is a like view of a still further modification of clamp.

Fig. 8 is a front elevation of the bumper with the clamping bar removed to more clearly show the formation of the overlapping ends.

Referring to the drawings in detail wherein like characters of reference denote corresponding parts, the reference character 10 indicates the side members of the frame of a motor vehicle, to which the bumper is designed to be secured. In the construction of the majority of automobiles, the front portion of the frame is equipped with a splash pan and it is the purpose of the present invention to provide means for securing the bumper in position when such a pan is used.

It is also the purpose of the invention to provide a novel form of bumper and with this end in view the invention comprises a pair of resilient bars 11, which are bent intermediate their length as indicated at 12 and have one end secured to the side bars 10 of the frame and their opposite ends extending inwardly transversely of and toward the center of the vehicle, where they are joined together in a novel manner. This connection is effected by reducing the width of the meeting ends of the bars as indicated at 13 and arranging these reduced ends in overlapping relation one above the other in the same vertical plane. The overlapping ends are then secured together so that any sagging of the bumper at the joint is prevented.

The manner of securing the overlapping ends together consists in providing bars 14, which may be arranged in front, at the rear or both front and rear of the overlapping ends of the bars 11 and are adapted to be secured thereon by means of the clamp 15. This clamp comprises a band which is adapted to surround the bars and is split as indicated at 16 and provided with lugs 17. Openings 18 are provided in the lugs for the passage of an adjusting bolt 19, by means of which the clamp may be tightly secured around the bars.

Novel means are provided for securing the ends of the bars to the side bars 10 of the frame, said means comprising a block or clamp 20 of the shape shown in Figs. 2 and 5 of the drawings. This block is provided near one end with openings 21, for the passage of bolts 22, the latter being provided with hooks 23 at one end which engage over the lower flange of the side bar 10 of the frame and have their opposite ends engaged by an adjusting nut 24, so as to securely grip the flange. The clamp 20 is further provided with laterally extending spaced lugs 25, one of which may be located adjacent each of the openings 21 and these lugs are flattened upon their upper surfaces for contact with the under surface or edge of the side bar 10 of the frame. The opposite end of the clamp 20 is offset as indicated at 26 and the end of the bumper is bolted to this end of the clamp by means of bolts 27. One of these bolts pass through an outwardly curved arcuate slot 28 provided in the end of the clamp 20 and the other bolt passes through a preferably squared opening 29 located centrally of this end of the clamp and spaced from the slot 28. This permits of pivotal movement of the bumper so that the proper horizontal adjustment may be obtained.

This same adjustment may be obtained by arranging the openings 28 and 29 differently, for example, in Fig. 6 the outer end of the bumper is provided with an inwardly curved arcuate slot 30 and a longitudinally disposed elongated slot 31, one of the bolts passing through the slot 30 and the other through the slot 31 to permit of pivotal movement or adjustment.

In Fig. 7, the slot at the outer end of the clamp 20 is straight and is disposed transversely of the clamp as indicated at 32, while the slot 33 which is arranged longitudinally of the clamp after the manner of the slot 31 shown in Fig. 6, is slightly shorter due to the fact that it will not be necessary to provide a greater movement for the bolt which is located adjacent the end of the bumper, during its pivotal adjustment.

The invention is susceptible of various changes in its form, proportions and minor details of construction, and the right is herein reserved to make such changes as properly fall within the scope of the appended claims.

Having described the invention what is claimed is:—

1. The combination with a bumper for motor vehicles, of means for securing the same to the vehicle frame, said means comprising a clamp engageable with the outer face of the frame, hooks carried by the clamp and engaging the frame, means also carried by the clamp and engageable beneath the lower edge of the frame and means for adjustably securing the bumper to the clamp.

2. The combination with a bumper for motor vehicles, of means for securing the same to the vehicle frame, said means comprising a clamp engageable with the outer face of the frame, hooks carried by the clamp and engaging the frame, laterally extending lugs projecting from the clamp and engageable beneath the lower edge of the frame, and means for adjusting the bumper to the clamp.

3. The combination with a bumper for motor vehicles, of means for securing the same to the vehicle frame, said means comprising a clamp engageable with the outer face of the frame, hooks carried by the clamp and engaging the frame and bolts passing through alined openings in the bumper end and through openings in the clamp, said openings including a slot disposed transversely of the clamp to permit of vertical adjustment of the bumper.

4. A bumper for motor vehicles comprising a pair of resilient bars bent intermediate their ends, means for securing one end of each of said bars to the vehicle and means for securing the opposite ends of the bars together in overlapping vertical alinement.

5. A bumper for motor vehicles comprising a pair of resilient bars bent intermediate their ends, means for securing one end of each of said bars to the vehicle, an overlapping connection for the opposite ends of said bars, said connection being formed by cutting away the adjacent ends for a portion of their length to reduce the width of the bars and arranging them in the same vertical plane, reinforcing bars for said connection and clamps engageable over the bars and joints.

In testimony whereof I affix my signature.

PERRY D. READ.